United States Patent [19]

Wallace et al.

[11] Patent Number: 5,642,167
[45] Date of Patent: Jun. 24, 1997

[54] TV PICTURE COMPRESSION AND EXPANSION

[76] Inventors: Richard Scot Wallace, 834 Coleman St., Easton, Pa. 18042; Benjamin Boris Bederson, 413 Montclaire Dr., NE, Albuquerque, N.M. 87108; Eric Schwartz, 72 York Ter., Brookline, Mass. 01246

[21] Appl. No.: 354,226

[22] Filed: Dec. 12, 1994

Related U.S. Application Data

[63] Continuation-in-part of Ser. No. 918,358, Jul. 23, 1992, abandoned.

[51] Int. Cl.$^6$ ............................................. H04N 7/26
[52] U.S. Cl. ................................. 348/420; 348/581
[58] Field of Search .......................... 348/403, 420, 348/424, 581; 358/261.1, 261.3, 433; H04N 7/26

[56] References Cited

U.S. PATENT DOCUMENTS

| | | |
|---|---|---|
| 4,975,771 | 12/1990 | Kassatly . |
| 5,008,752 | 4/1991 | Van Nostrand . |
| 5,067,019 | 11/1991 | Juday et al. . |
| 5,175,617 | 12/1992 | Wallace et al. . |

*Primary Examiner*—Mark R. Powell
*Attorney, Agent, or Firm*—Eliot S. Gerber

[57] ABSTRACT

Many-to-one and one-to-many digital image transformations play a significant role in a variety of imaging communications, visualization, and robotic applications. A method is presented for forwarding mapping frames of TV images in a many-to-one mapping using run length encoding. A digital computer system includes a look-up table memory having the address of each input run-length of pixels (a series of side-by-side pixels) and the address of the single output pixel corresponding thereto. An example is a 512×512 pixel TV frame which, in real time, is mapped onto a log polar coordinate TV frame of 2000–3000 pixels. This method can be used with existing low-cost general purpose computers providing a speed advantage approximating five-hundred percent, and a memory savings of between 10 and 100,000 times, relative to the current art. As a result, electronic imaging systems employing many-to-one or one-to-many image warps may be built in significantly smaller, cheaper, faster and lower power implementations.

10 Claims, 4 Drawing Sheets

TV PICTURE COMPRESSION AND EXPANSION

Related Application

This application is a continuation-in-part application partially based upon Ser. No. 08/918,358, filed Jul. 23, 1992, abandoned.

FIELD OF THE INVENTION

A method and system for transformation of a TV image by mapping many image pixels into an image having fewer pixels.

BACKGROUND OF THE INVENTION

Many areas of electronic imaging require the transformation of a "conventional TV image" into a new, or "warped", many-to-one, or one-to-many representation. In a warped representation, an output image may be found by averaging many input pixels to form one output pixel (many-to-one), or an output image may be formed in which one input pixel is portioned between many output pixels (one-to-many). A pixel is a two-dimensional picture element of an image or display device, such as a TV screen. The term "conventional TV image" means the output of an imaging device which samples an optical image in either the infra-red, visible, or ultra-violet brands of the electro-magnetic spectrum, in such a way that each pixel, or sample, corresponds to an equal solid angle sample of the scene, or object, which is being optically imaged. In other words, each pixel of a conventional TV image refers to the same solid angular region of the imaged environment.

RELATED ART

In the transmission and reproduction of images, especially in the industrial, military, space and medical fields, it is sometimes necessary or desirable to compress or expand the image, using fewer or more pixels in the original image than in the reproduced image. For example, in medical images an image having fewer pixels, for example 10,000, may be expanded by replicating the pixels so that the final image may have more pixels, for example, 90,000, to present an image which may be more readily interpreted by medical personnel. As another example, it is sometimes required to reduce the number of pixels so that the image may be transmitted over a narrow band transmission channel. For example, an original image of 400×400 pixels (160,000) may be reduced to a final image of 200×200 pixels (40,000) by treating each block of 4 pixels in the original image as, in effect, one large pixel; averaging the intensity of the 4 pixels and mapping the averaged intensity onto one pixel in the final image.

A simple example of a many-to-one image warp is size reduction of an image. Thus, a size reduction may require the transformation of four pixels of the input to one pixel of the output. The inverse is size expansion in which one pixel is transformed with many pixels ("one to many"). A more significant example of many-to-one image warping is a transformation of the image by a function such as the log-polar or complex logarithmic, mapping, as described in U.S. Pat. No. 4,267,573 to Chaiken and Weiman, incorporated by reference. One practical application of their invention is to provide a form of size and rotation in variance, for pattern recognition, which is achieved by the use of a "log-polar" mapping. In log-polar mapping ("log map") an output pixel, whose coordinates are denoted by (u,v) receives input pixels, whose coordinates are (i) according to the equation $u=\log \sqrt{i^2+j^2}$ and $v=\tan^{-1} j/i$ where i represents the row and j represents the column of a raster. Log-polar mapping is one example of a large class of mappings in which many input pixels correspond to a single output pixel. In the same way, the exponential polar mapping, which is the inverse of the log-polar mapping, is an examplar of a large class of mappings in which one input pixel is proportioned between many output pixels.

A particular method for performing image warp exemplified by such log-polar mapping is described in U.S. Pat. No. 5,067,119 to Juday and Sampsell ("Juday"), incorporated by reference. In Juday a parallel processor computer design, using "massive" look-up tables to store the particular image warp being used, and to perform the image warp in real-time (i.e., 30 frames per second) is described. Also, three different aspects of the image warping problem are discussed, and it is important to distinguish carefully between them. These are:

Coordinate warp:
This refers to the specification of the address of the output pixel which corresponds to its corresponding input pixels for the many-to-one warp.

Interpolation:
This refers to the weighing of input pixels that correspond to a single output pixel. If this weighting is equal, that is, all input pixels are simply added to form the output pixel, then interpolation is not necessary. Methods for interpolation have been described in Juday (U.S. Pat. No. 5,067,019) and in van Nostrand (U.S. Pat. No. 5,008,752). In Juday interpolation is performed for each input pixel. In the present invention interpolation, if it is performed at all, is done in series, at the end of the processing of the frame.

Normalization:
This refers to dividing the output pixel by some normalization factor, i.e., such as averaging, to account for the many input pixels which have been added to form each single output pixel. For the case in which all pixels are weighted equally, this normalization factor is simply the number of input pixels which have been added to form a single output pixel. This normalization factor might also be estimated from the Jacobian of the mapping, which represents the ratio of areas of output to input. In Juday this normalization is estimated from the Jacobian and is applied for each single input pixel. In the present invention it has been found that it is more efficient to apply this normalization factor in series, that is, at the end of processing the entire frame, as discussed below.

We have found that the coordinate warp is the principal area of difficulty for any image warping process, since the interpolation is often unnecessary and can, in any case, be performed by a simple low-pass filter applied after the processing of the video frame. The normalization step is much more efficiently performed at the end of the frame, as described below.

Both Juday and the present invention use an Address Lookup Table (ALUT). The ALUT effects an image warp by storing an array of address values, one for each incoming pixel, and manipulates the incoming pixels using these addresses in the output array, to assign groups of incoming pixels to specification locations in the output array. There are two problems with Juday, which present a low-cost, or economical, implementation. These problems concern the cost, in both memory and computation speed, of the "massive" (see Juday col. 3, line 55) ALUT "which sequentially reads out 16-bit addresses—one for each input pixel" (Juday and Sampsell, col. 10, lines 14–15). Juday describes the method of operation of their invention to apply to each incoming pixel, individually, and singly. " . . . the Collective Processor multiplies each incoming pixel value by a weighting factor and places it in a new output address . . . " (Juday, col. 7, lines 16–18). First, the ALUT required by Juday must be equal in size, at least to the input image since there must be one output address stored in the ALUT for each input pixel address. Secondly, this memory, and the associated electronic hardware, must be extremely fast, if the output image is to keep up with the rate of incoming images, since many operations must be performed on each incoming pixel and a typical rate at which TV pixels must be processed is in the range of five to ten million per second.

The performance of the "coordinate warp", "interpolation" and "normalization" operations must be done within a single pixel acquisition time if the Juday method is to be applied in "real time", that is, to keep up with the rate of incoming pixels. This time, for a typical video signal, is equal to 100 nanoseconds and is, typically, of a similar short duration for the common video standards, e.g., PAL or NTSC. As a result, a device constructed according to Juday will necessarily be large, expensive, consumptive of power, and heavy. Since many of the application areas for many-to-one warping require small, inexpensive, lightweight and low-power devices, the present invention presents a new method and system which eliminates many of the steps necessary in the prior art.

SUMMARY OF THE INVENTION

In accordance with the present invention there is provided a method and system for forming an image having fewer pixels from an image having many more pixels.

More particularly, one may form a log-polar mapping (logmap) image of fewer pixels from a rectangular pixel array having more pixels. This is particularly useful as rectangular arrays are commercially available as CCD (Charge Coupled Device) MOS or CID or Videcon TV image sensors. For example, such rectangular CCD devices may have 100×100 to 2000×2000 pixels. The logmap image having fewer pixels, for example, 4,000 may be used in a Picturephone (TM of AT&T) system and be transmitted over a narrow band voice quality telephone line. The output image, in logmap format, may be viewed directly or may be inverse mapped to a rectangular pixel to form a conventional TV image.

In this method the original rectangular array is analyzed on a raster basis, i.e., side-to-side, a line at a time, from top to bottom. Groups of aligned side-by-side input pixels are combined to form a "run" and each run is mapped, as a group, to a single output pixel ("target pixel") of the logmap.

In operation, the luminance intensities of the pixels in a run (group of pixels on a line) are averaged to form the single intensity value of the output pixel to which the run is mapped. The address of the line is transmitted to a look-up table which provides the corresponding address of the logmap pixel (Target). That corresponding pixel receives and displays the averaged intensities of the run.

The foundation of the present invention is that the structure of the prior art address look-up table (ALUT) is highly redundant. In a many-to-one image transformation, there are many instances of long runs of addresses in the ALUT which are the same. These runs of addresses correspond to a single output pixel which receives many input pixels. Manipulation of an image in terms of a "run length" code provides "lossless" image compression. The set of runs of gray scale luminance values often uses much less data than the original pixel values themselves. This can be made explicit by considering the following example of run length encoding of an image.

Image Gray Scales: 22233333155555

Run Length Representation: –32–53–11–45

In the usual image gray scale representation, there is one gray scale value for each pixel. In the Run Length Representation, a negative number is sometimes used, as in this example, to indicate the length of the "run". The value of the run is then indicated by the next positive number. In the example above, –32 indicates a run of 3 pixels of value 2; –53 indicates a run of five pixels of value 3, etc. It can be seen that the Image Gray Scale and Run Length Representations are different ways of coding the same image.

When there are many runs of great length, the run length coding of the image provides "lossless compression", in that the run length coded image will contain precisely the same information as the original image, but in a more compact form.

Run length coding may be used to compress the size of images. A key innovation of the present invention is to employ run length coding of an image along with a look up table (ALUT) of an image transformation. We call such a run-length encoded address look-up table a RLE-ALUT. The advantage of the present invention is not only to obtain data compression of the ALUT, but to obtain computational efficiency in the performance of the many-to-one image transformation by the use of this RLE-ALUT in an efficient manner.

BRIEF DESCRIPTION OF THE DRAWINGS

The following detailed description should be taken in conjunction with the accompanying drawings. In the drawings.

DETAILED DESCRIPTION

Figure 1:
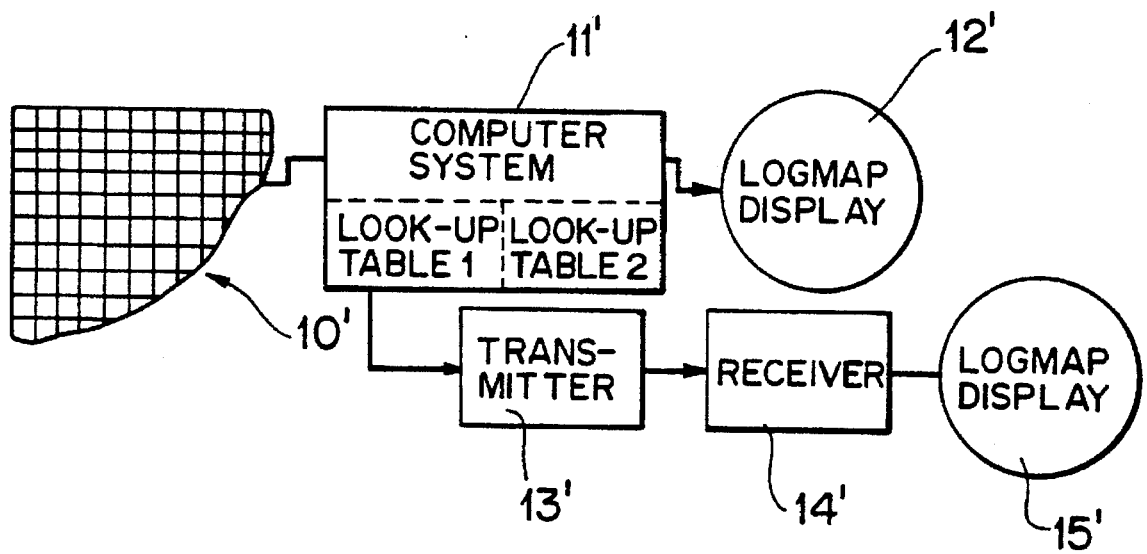
FIG. 1 is a block diagram of the overall system of the present invention.

The advantage of the method of the present invention can be understood by considering the example of the most extreme form of many-to-one image warp possible: a transformation of all input pixels to a single output pixel. This case, although perhaps not of practical interest, is important because it allows a simple quantitative estimate of memory utilization and processor efficiency in a direct comparison of the present invention and the invention of Juday and Sampsell (U.S. Pat. No. 5,067,019). Moreover, the issues of "coordinate warp", "interpolation" and "normalization" are clearly and separately made explicit by this example.

Consider the input image in this example to be 512×512 pixels of address (i,j), with the address values of i and j ranging between 0 and 511. Consider the output image to consist of a single pixel, of address (u,v)=(0,0), since this is the ALL-TO-ONE mapping.

The RLE-ALUT will contain the following entry: –262, 144 O.O. In other words there are 512×512, or 262,144 repetitions of the output pixel address 0.0. These two entries may be compared to the 262,144 address entries required by Juday. This is a compression, or savings of memory space with no loss of information, of more than 100,000.1 compared to Juday.

OPERATIONS COUNT OF THE RLE-ALUT METHOD (S is Step):

S1: Obtain the index (i,j) of the first pixel in the frame.

S2: Retrieve the address of the output pixel (a single pixel in this example)

S3: For a number of input pixels equal to the length of the run (262,144 in this example), accumulate (add) the luminance values from the input image pixels and place that number into the register of the RLE-ALUT containing the output pixel.

S4: At the end of the run (262,144 in this example) return the output pixel to its storage location.

S5: Done with entire frame. Wait for first pixel of next frame.

In the same of the all-to-one transformation, we have demonstrated the memory and speed advantages of the method of the present invention over Juday for this particular example for the "coordinate warp" component of the many-to-one transformation. The interpolation and normalization are, in this case, trivial, since no interpolation is required for the ALL-TO-ONE MAP, and normalization requires the division of the single output pixel value by 262,144, at the end of processing the frame. However, the following brief discussion of interpolation and normalization will clarify the present method for performing these operations. For common examples of many-to-one warps, it is not necessary to perform either interpolation or normalization in the "inner loop" of the image transformation, i.e., within the loop of the steps S1–S6 outlined above. Normalization can be performed at the end of the transformation of the entire image, i.e., serially, after the completion of the coordinate warp. Thus, to normalize the output in the above example, one simply divides by the number of pixels, after the entire frame has been processed, i.e., divide the output pixel accumulated value by 262,400. Juday would perform this normalization 262,400 times by dividing each pixel by the Jacobian of the image transformation, which is 262,400 for the 512×512 array, prior to accumulating the pixel.

Interpolation also may be performed outside of the inner loop (steps S1–S6), thus also simplifying the hardware necessary to perform this image transformation. The coordinate warp is performed efficiently with the use of a RLE-ALUT and the operations of "normalization" and "interpolation" are postponed to the end of the image transformation, i.e., serially, rather than performing them on each pixel in the inner "busy" loop of steps 1–6 above.

EXAMPLE OF LOG POLAR MAPPING

The second example to clarify the present invention is based on the use of a complex logarithmic mapping, as discussed by Chaiken and Weiman (U.S. Pat. No. 5,008,752) and also by Juday and Sampsell (U.S. Pat. No. 5,067,019).

This case is of much greater practical import. However, it is not possible to easily compute the closed form advantages of memory and speed in this case, as it was for the simpler ALL-TO-ONE map of the first example. Vision Applications, Inc. of Allston, Mass., has measured the number of image runs for an example of a log-polar, or complex logarithmic mapping used for a practical type of its own picture-phone application, and computed the average number of instructions per pixel for this case, which can then be directly compared to the ALL-TO-ONE mapping which can be exactly computed as above. The summary of this calculation is that the log-polar mapping requires an average of 1.13 instructions per pixel, compared to the ideal result for the ALL-TO-ONE mapping of very slightly more than 1 operations/pixel, and a result of six operations per pixel for the ALUT method of Juday. In other words, the RLE-ALUT method of the present invention achieves advantages for a practically important log-polar mapping that is nearly as great as the advantage for the theoretically optimal ALL-TO-ONE mapping.

Finally, the interpolation and normalization for the log-polar mapping may also be done after the completion of the "coordinate warp". The normalization simply requires the division of each of the output pixels by an amount that is equal to the number of the input pixels which were summed into it. Since the number of output pixels is only on the order of 1,000 to 8,000, and typically is 2000 to fewer than 4000, it is far more efficient to perform this normalization only on the output pixels, rather than on each incoming contribution to the output pixel, as is done by Juday. The number of input pixels is typically 512×512 and is generally more than 300× 300 or at least 200×200 formed by rows and columns into a rectangular array which is raster scanned. For the 300×300 pixel array the forward mapping uses less than 120,000 instructions.

Also, the interpolation of the image, which amounts to a "smoothing" or weighting average of input pixels onto an output pixel, is more efficiently done for the small output image by a simple low-pass filter, applied to the output image. Once again, it is not efficient to perform interpolation, or normalization, in the busy inner loop of the "coordinate warp" (steps 1–6) but rather, at the end of the transformation of the image frame (for example, during the vertical blanking interval), since the output image typically has a small number of pixels. And, as a matter of practice, many applications do not require interpolation at all, since the output of the coordinate warp is sufficiently "smooth" for practical purposes.

As shown in FIG. 1, the pixel array is a rectangular array of evenly spaced columns and rows. For example, array 10' may be the CCD of a TV camera having 100×300 pixel array (90,000 pixels).

Each pixel is black-white and has an intensity level from 0 (white) to, for example 255 (black). Each pixel has an address (x,y coordinate system) which gives the coordinate warp and an intensity level, for example (from 0 to 255).

The input pixel array 10' is connected to computer system 11' whose output is the data that forms the logmap display 12' on, for example, a high resolution TV monitor. Alternatively, the computer system may be connected to transmitter 13', for example, a narrow frequency band MODEM, to transmit over a voice grade telephone line to receiver 14". The receiver 14' is connected to the logmap display, for example, a TV monitor.

Problem statement

We formally define the warp as a mapping from a raster TV image I(i,j) where i={0, ..., m–1} and J←{0, ..., n–1}. For example, the TV image I may be a rectangular CCD array of pixels and i is the column number and j is the row number. Let L(u,v) be the warped image, with u $\in$ {0, ..., r–1} and v $\in$ {0, ..., s–1}. For example, L(u,v) is a logmap in which u is the row and v is the column.

Let a(u,v) be the area (in original TV pixels) of a warp image pixel (u,v):

$$a(u,v) = \sum_{i,j} 1 | u = r(i,j) \text{ and } v = s(i,j). \quad (1)$$

The warp is defined as $$L(u,v) = \frac{1}{a(u,v)} \sum_{i,j} I(i,j) | u = r(i,j) \text{ and } v = s(i,j). \quad (2)$$

For example, in the center of the log map warped image one pixel (u,v) may equal one pixel in the original image, i.e., 1 mm; but may be much larger (10 mm) at the outer edge. Here (r,s) is the address on the target (warped) image (the logmap image). The inverse warp $L^{-1}$ (u,v) is the set of TV pixels (i,j) such that r (i,j)=n and s(i,j)=v. The inverse warp may be used to go from logmap to a rectangular array.

We often encounter cases were sr<<mn (memory size) or many of the warped pixels (u,v) are large: 1<<a(u,v). In these cases the warped image has a small number of pixels that cover large regions of the TV image in addition to others which are smaller. These cases, of large pixels, vividly illustrate the idea of "many-to-one" mapping.

Preprocessing the lookup tables

First, we analyze the two lookup tables (r(i,j) and s (i,j)). These are preferably in ROM. If we can the tables in order, we find runs, or sequences of length 1 in which:

$$r(i,j) = \ldots = r(i,j+l-1) \quad (3)$$
and
$$s(i,j) = \ldots = s(i,j+l-1)$$

Within such a run, the index (r,s) into the logmap array is unchanged. The raster scan is partitioned into a sequence of q such runs $R_O, \ldots, R_{q-1}$ where $R_p=(r_p, s_p, 1_p)$. The warped image index of the pth run is $(r_p, s_p)$ and the length of the run is $l_p$.

Figure 2:
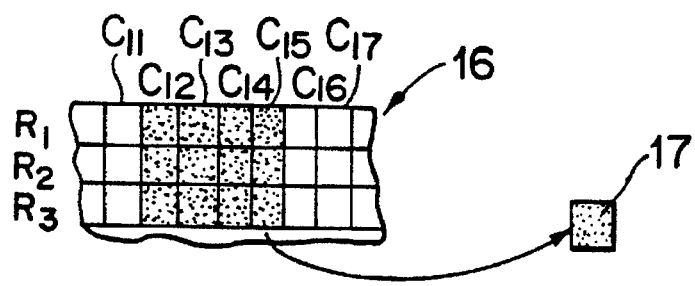
FIG. 2 is a diagram of mapping from a raster scan to a logmap image.

FIG. 2 shows an example of this portion of the method. In FIG. 2 the original image I(i,J) is shown as having columns $C_1 \ldots C_n$ and rows $R_1 \ldots R_n$. The 12 pixels $C_{12}, R_1$-$C_{15}R_1$ and $C_{12}, R_2$-$C_{15}, R_2$ and $C_{12}, R_3$-$C_{15}, R_3$ are all mapped onto the single pixel 17 of the logmap image. The pixels $C_{12}, R_1$-$C_{15}, R_1$ are one run, $l_i$; the pixels $C_{12}, R_2$-$C_{15}, R_2$ are a second run $l_2$; and the pixels $C_{12}, R_1$-$C_{15}, R_3$ are a third run $l_3$.

Each of the pixels has an intensity white-black value of from 0 (white) to 255 (black).

The intensity values in each run, 1, are added up and averaged. For example, in the run $l_1$ (pixels $C_{12}, R_1$-$C_{15}, R_1$) the four intensities may be 177, 211 220 and 201, respectively, for an average of 202.

The look-up table need relate, in this example, only the three runs $l_1$, $l_1$ and $l_3$ instead of the 12 original pixels.

HARDWARE DESCRIPTION

In alternate embodiments, the forward map circuit can be implemented, in solid-state integrated circuits, using Electrically Programmable Read Only Memory (EPROM) and/or an Erasable Programmable Logic Device (EPLD).

EPROM Discrete Components Circuit

Figure 3:
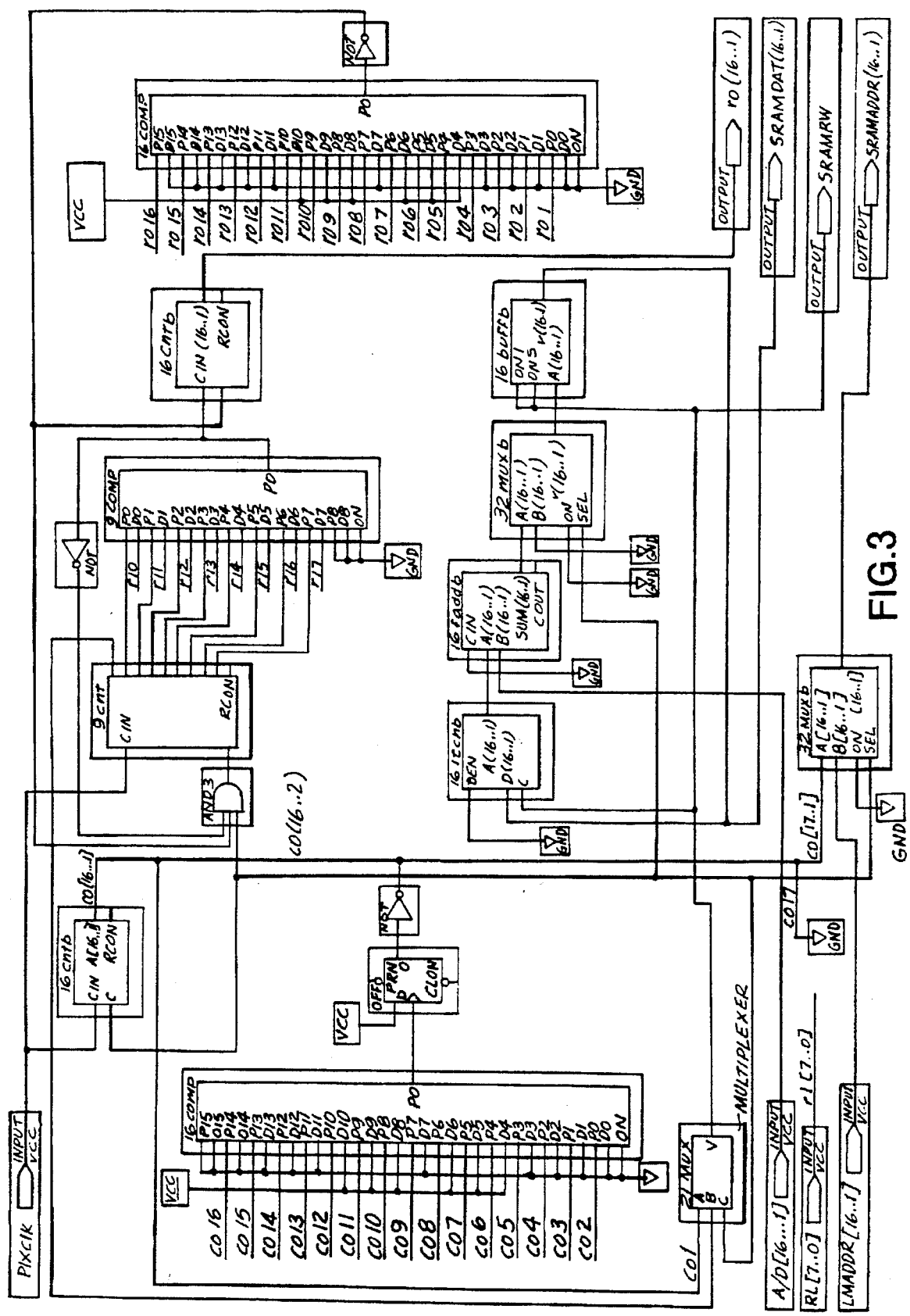
FIG. 3 is a block diagram of the preferred circuitry.

The forward map circuitry, shown in FIG. 3, consists of four main parts, the initialization circuitry 20, look-up table EPROM 22, addition circuitry 22, and supporting counters and multiplexers 13.

At power-on the circuit is reset to an initialization stage which uses a 16-bit address counter, made up of four 74bc162's (U3, U4, US, U6) to clear the SRAM (Static Random Access Memory). During the period the address multiplexers (U19, U20, U21, U22) select the 16-bit address counter and the data multiplexers (U23, U24, U30, U31) select ground inputs to zero the SRAM. The initialization stage ends when the 16-bit address counter reaches the value compared to by IC's U13 and U15 ("IC" is Integrated Circuit).

Once initialization has been completed comparisons U15 and U13 will toggle the multiplexers and enable an 8-bit pixel counter, made up of U11 and U12, and 16-bit run length address counter, made up of U7–U10. With these parts active the current address, provided by the 16-bit run-length address counter, addresses EPROM (Electrically Programmable Read Only Memory) U37 to provide an appropriate run-length. This run-length value provided by the EPROM is compared with the 8-bit pixel counter.

A 16-bit adder made up of U16, U17, U28, U29 is used to sum up new values digitized by external A/D's (Analog/Digital converter) with either current values stored in SRAM, U27, or previously added values which are part of the same run-length and are supplied by the address through IC's U35 to U36 (74nc244 3-state buffers).

Comparator U14 will trigger when a run is complete. This will cause the 16-bit run-length address counter to clock to the next address which in turn starts the cycle over again. The 16-bit run-length address counter also addresses a logmap pixel output address EPROM U38. U38 provides the appropriate logmap pixel address for which the new run is to be stored and/or added to.

Comparators U33 and U34 check for an end of frame at which point the circuitry is reset and the process starts again from initialization.

Programmable Logic Device Circuit

The forward map circuit can also be implemented using an Erasable Programmable Logic Device (EPLD). Using an EPLD the circuit would consist of two EPROM's, an SRAM and an EPLD. The circuit logic remains the same in both cases.

Figure 4A:
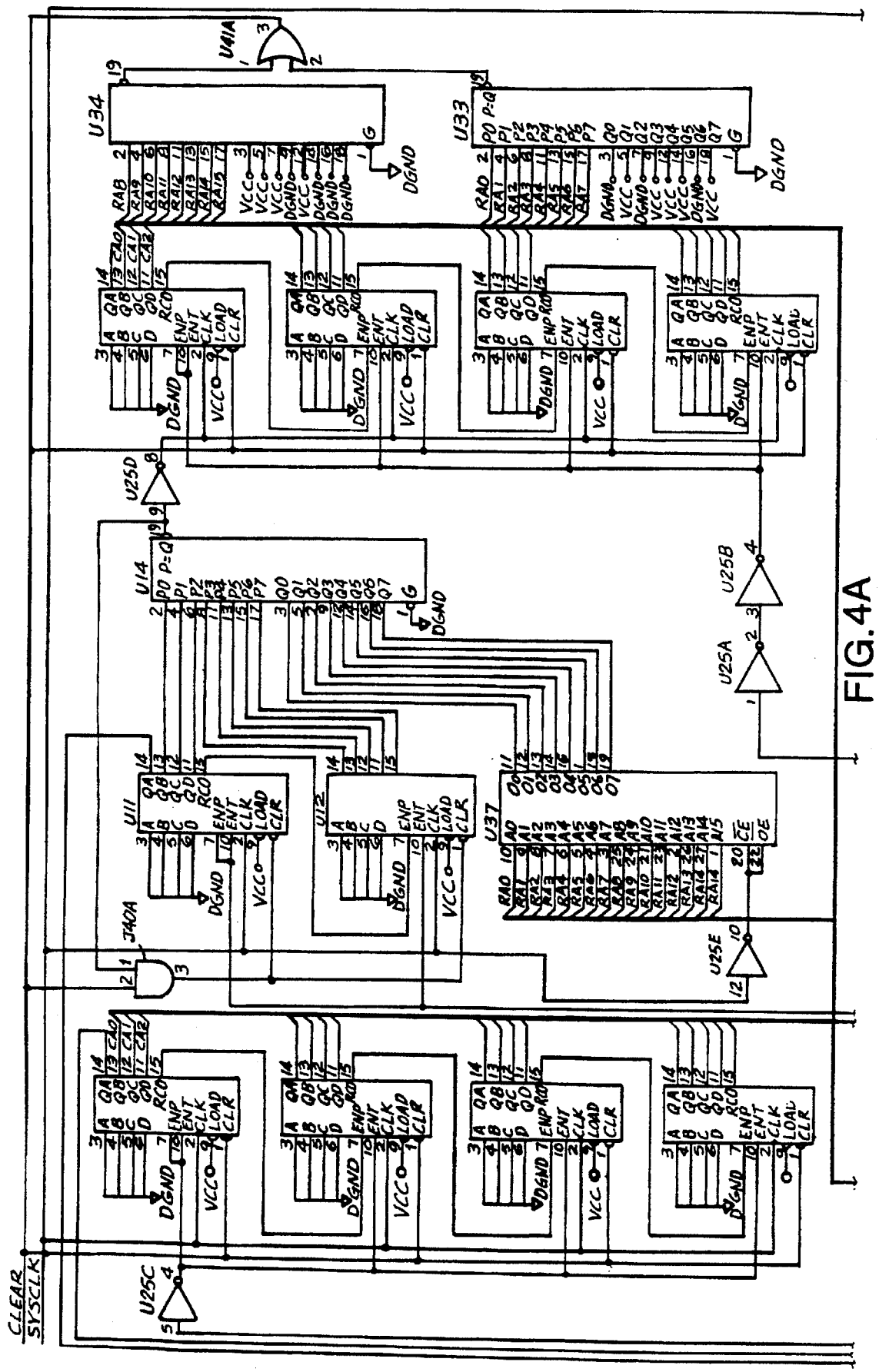
FIGS. 4a and 4b are a circuit diagram of the preferred circuit showing a schematic (root sheet) of a circuit board for the forward logmap.
Figure 4B:
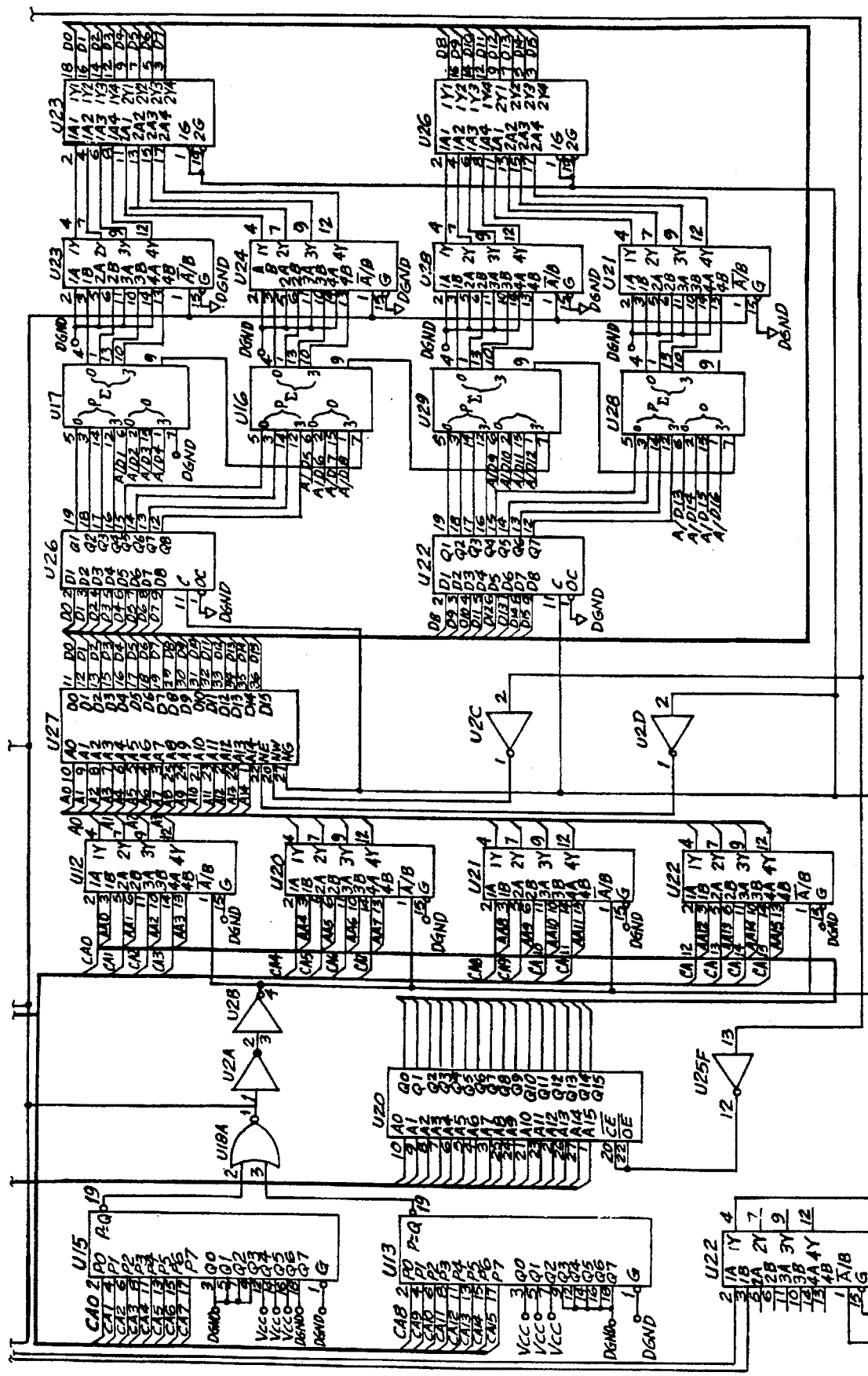

FIG. 4 shows a schematic of the internal EPLD elements. 16-Bit address counter, element 20, corresponds to U3–U6 in the discrete components design. Similarly the 9-bit counter takes the place of U11 and U12, 16-bit counter 23, replaces U7–U10, multiplexers 14 and 29 will replace U19–U22 and U23 U24 U30 U31 respectively. The diagram also shows the 16-bit latch 28, which replaces U26 and U32. 16-bit buffer 30 will take the place of U35 and U36.

The inputs and outputs from the EPROM's, SRAM and A/D are also shown. These connections, as well as the other internal logic, can be easily reprogrammed to accommodate many different image warping algorithms.

This design fits into a single ALTERA EMP7128 (available from ALTERA, 2610 Orchard Parkway, San Jose, Calif. 95134, which contains 2500 usable gates with 41 input sums, 33 output pins and 16 bidirectional pins. This design utilizes 93% of the EPM7128.

Using an EPLD the pixel clock can be as fast as 20 MHz, which corresponds to over 100 forward mapped images per second. It is important to note that this is a general design which gives the user the ability to use run lengths of 128 pixels and produce warped image sizes of 65 Kb. Smaller specialized designs can be implemented using smaller, cheaper EPLD's which in turn will run up to 8 times faster.

What is claimed is:

1. A method of forwarding mapping frames of original TV images, each of the original TV images being composed of a plurality of input pixels into a warp TV image having fewer output pixels; the method including the steps of:

(a) selecting corresponding run sequences of input pixels each being a run sequence in the original TV image, and assigning each corresponding run sequence to a different one selected corresponding output pixel of the warped TV image said assignment being in a digital computer memory look-up table, wherein each corresponding run sequence is composed of a plurality of input pixels aligned side-by-side;

(b) sampling and accumulating the luminance intensities of the input pixels of each corresponding run sequence of the original TV image;

(c) using the digital computer look-up table and inputting thereto the address of each corresponding run sequence and outputting therefrom the address of an output pixel of the warped TV image corresponding thereto;

(d) normalizing the luminance intensities of the output pixels based upon the number of input pixels in the run sequence corresponding thereto; and (e) illuminating each corresponding output pixel with the normalized luminance intensity derived from the run sequence corresponding thereto.

2. A method as in claim 1 wherein the original TV image is an array of rows and columns of more than 300×300 pixels and the warped TV image is a log polar image having fewer than 4000 pixels.

3. A method as in claim 2 wherein the forward mapping uses less than 120,000 instructions for each frame.

4. A method as in claim 1 wherein in step (d) the normalizing is performed by averaging the luminance intensities.

5. A method as in claim 1 wherein the normalization of step (d) is performed after each frame is forward warped by steps (a)–(c).

6. A method of forwarding mapping frames of original TV images, each of the original TV images being composed of a rectangular array of at least 200×200 pixels, into a log polar warp TV image having fewer than 8000 pixels; the method including the steps of:

(a) selecting corresponding run sequences of pixels, each being a run sequence in the original TV image, and assigning each corresponding run sequence to a different one selected corresponding target pixel of the warped TV image, said assignment being in a digital computer memory look-up table, wherein each corresponding run sequence is composed of a plurality of pixels aligned side-by-side;

(b) sampling and accumulating the luminance intensity values of the pixels of each corresponding run sequence;

(c) using the digital computer look-up table and inputting thereto the address of each corresponding run sequence and outputting therefrom the address of its corresponding target pixel in the warped TV image; and (d) subsequently normalizing the luminance intensities of the target pixels; and (e) illuminating each corresponding target pixel with the normalized luminance intensity derived from its corresponding run sequence.

7. A method as in claim 1 wherein the original TV image is a rectangular array of columns and rows of more than 300×300 pixels and the warped TV is a log polar image having fewer than 4000 pixels.

8. A method as in claim 7 wherein the forwarding mapping uses less than 120,000 instructions for each frame.

9. A method as in claim 1 wherein in step (d) the normalizing is performed by averaging the luminance intensities.

10. A method as in claim 1 wherein the normalization of step (d) is performed after each frame is forward warped by steps (a)–(c).

* * * * *